United States Patent [19]
Johnson

[11] Patent Number: 5,839,071
[45] Date of Patent: Nov. 17, 1998

[54] BASE STATION FOR A MOBILE TELECOMMUNICATIONS SYSTEM

[75] Inventor: Andrew Brian Johnson, Glen Waverley, Australia

[73] Assignee: Telstra Corporation Limited, Melbourne, Australia

[21] Appl. No.: 617,917

[22] PCT Filed: Mar. 21, 1994

[86] PCT No.: PCT/AU94/00561

§ 371 Date: Jun. 10, 1996

§ 102(e) Date: Jun. 10, 1996

[87] PCT Pub. No.: WO95/08896

PCT Pub. Date: Mar. 30, 1995

[30] Foreign Application Priority Data

Sep. 21, 1993 [AU] Australia ............................. PM1363

[51] Int. Cl.⁶ ............................................... H04Q 7/00
[52] U.S. Cl. ..................... 455/440; 370/331; 455/456
[58] Field of Search ................................. 455/436, 440, 455/444, 446, 449, 450, 456, 507, 517; 370/331–334

[56] References Cited

U.S. PATENT DOCUMENTS

| | | | |
|---|---|---|---|
| 4,217,588 | 8/1980 | Freeny, Jr. .......................... | 455/456 X |
| 5,448,751 | 9/1995 | Takenaka et al. ..................... | 455/450 |
| 5,483,537 | 1/1996 | Dupuy ................................ | 370/337 |
| 5,551,060 | 8/1996 | Fujii et al. ......................... | 455/444 X |
| 5,579,373 | 11/1996 | Jang ................................ | 455/436 |
| 5,657,487 | 8/1997 | Doner ................................ | 455/440 X |

FOREIGN PATENT DOCUMENTS

| | | |
|---|---|---|
| 9457532 | 9/1994 | Australia . |
| 0 536 864 | 4/1993 | European Pat. Off. . |
| 232106 | 10/1994 | Taiwan . |
| 234226 | 11/1994 | Taiwan . |
| 234802 | 11/1994 | Taiwan . |
| 17954 | 10/1992 | WIPO . |
| 20625 | 10/1993 | WIPO . |
| 08896 | 3/1995 | WIPO . |

OTHER PUBLICATIONS

International Search Report for PCT/AU94/00561 issued Nov. 25, 1994.

*Primary Examiner*—Thomas J. Mullen, Jr.
*Attorney, Agent, or Firm*—Thomas J. Engellenner; David A. Lane, Jr.; Lahive & Cockfield, LLP

[57] ABSTRACT

A base station (202) for a mobile telecommunications system, adapted to communicate with mobile stations (208, 210) of the system which are within a cell area, the cell area being divided into an inner area (204) in which distances to the base station (202) are within a first predetermined range, and an outer area (206) in which the distances are within a second predetermined range, the base station (202) including a first transceiver operating at a first carrier frequency and adapted for communication with mobile stations (208) in the inner area, and a second transceiver operating at a second carrier frequency adapted for communication with mobile stations in the outer area (210).

28 Claims, 12 Drawing Sheets

BASE STATION FOR A MOBILE TELECOMMUNICATIONS SYSTEM

REFERENCE TO RELATED APPLICATIONS

This application was filed under 35 U.S.C. §371 and is based upon International patent application No. PCT/AU94/00561, filed Sep. 21, 1994.

BACKGROUND OF THE INVENTION

The present invention relates to a base station for a mobile telecommunications system, a mobile telecommunications method, and an extended cell system.

Mobile telecommunications systems are generally based on cellular radio networks where the network comprises a number of base stations which each handle all communications with mobile stations that are within a respective area referred to as a cell. By placing base stations so that boundaries in the respective cells are adjacent to or overlap one another, handover protocols can be established to enable mobile stations to move between cells and continue a call without any discernible indication that the call handled by one base station has been transferred or handed over to another base station. Calls handled by the base stations are passed to associated mobile switching centres, which act as switching exchanges and connect with the exchanges of other networks, such as the public switched telephone network (PSTN).

Analogue cellular radio systems are now being replaced by more efficient and sophisticated digital systems, one of which is the groupe specialé mobile (GSM) digital cellular radio system. The GSM system was derived by a groupe specialé mobile established by the Committee of European Posts and Telecoms (CEPT), and is currently in use in Europe and Australia. The specification for the GSM system comprises over 100 recommendations administered by the European Technical Standard Institute (ETSI). A general description of the air interface of the GSM system is provided in M. R. L. Hodges, "The GSM radio interface", Br. Telecom Technology J., Vol. 8, No. 1, January 1990, pages 31 to 43.

The GSM system is based on the transmission of time division multiple access (TDMA) frames which each comprise eight 577 µs timeslots (TS). To maintain the integrity of the system, communications between a base station (BS) and a mobile station (MS) must be synchronised. To maintain synchronisation as a mobile station moves within a cell, the base station must take into account the distance between it and the mobile station. The GSM system uses an adaptive time alignment system to ensure transmissions from the mobile station arrive at their destination in the correct timeslots without any overlap. By monitoring initial access transmissions, and continuing to monitor transmissions from the mobile station, the base station is able to determine the separation distance, and transmits a 6 bit timing advance (TA) number to the mobile station which represents the number of bits by which the mobile station must advance its frame transmissions to account for the delay in travel to the base station. The GSM specification imposes a 6 bit limit on the size of the TA, which restricts the distance a mobile station can travel from a base station, and therefore restricts the size of a cell which a base station can cover. Whilst this limitation imposes little difficulties in densely populated areas where a relatively large number of base stations are available to complete a cellular network, in sparsely populated rural areas it would be desirable to be able to extend a base station's coverage beyond the limits imposed by the GSM TA restriction.

One way of extending the cell coverage would be to increase the size of the TA by 1 bit so that it could represent seven bit numbers instead of six. This, however, would require significant changes at the base station and for all mobile stations which wish to take advantage of the extended cell radius. Adjusting all mobile stations is impractical, and it is also not considered prudent to depart substantially from the GSM specification.

Another method involves using only every second timeslot in a TDMA frame so as to allow transmissions to be received in or overlap a succeeding timeslot when a mobile station moves outside the normal cell area. This however results in a significant waste of capacity, in that the capacity of the base station is reduced by half. The base station also needs to be relatively flexible so it can receive transmissions within a wide variety of delays.

SUMMARY OF THE INVENTION

In accordance with the present invention there is provided a base station for a mobile telecommunications system, adapted to communicate with mobile stations of said system which are within a cell area, said cell area being divided into an inner area in which distances to said base station are within a first predetermined range, and an outer area in which said distances are within a second predetermined range, said base station including:

a first transceiver operating at a first carrier frequency and adapted for communication with mobile stations in said inner area; and a second transceiver operating at a second carrier frequency adapted for communication with mobile stations in said outer area.

The present invention further provides a mobile telecommunications method, comprising:

providing a base station having a first transceiver operating a first carrier frequency and a second transceiver operating a second carrier frequency, said base station being adapted to communicate with mobile stations of a mobile telecommunications system which are within a cell area;

dividing said cell area into an inner area in which distances to said base station are within a first predetermined range, and an outer area in which said distances are within a second predetermined range; and allocating communications with said mobile stations in said inner area to said first transceiver and allocating communications with mobile stations in said outer area to said second transceiver.

The present invention also provides a base station for a mobile telecommunications system, including a plurality of transceivers operating at respective carrier frequencies and which are used to communicate with mobile stations of the system within a cell area, characterised in that each transceiver is allocated a respective communication zone for communicating with mobile stations in said zone, and each communication zone covers distances to said base station within a respective predetermined range.

The present invention also provides an extended cell system for a mobile telecommunications system, including at least first and second transceivers operating at respective carrier frequencies and which are used to communicate with mobile stations of the telecommunications system within a communication zone, characterised in that said communication zone includes a cell area and an extended cell area and each transceiver is allocated a respective one of said cell areas for communicating with mobile stations in said zone, said cell area covering distances to said first transceiver within a first predetermined range and said extended cell area covering distances to said second transceiver within a second predetermined range.

BRIEF DESCRIPTION OF THE DRAWINGS

Preferred embodiments of the present invention will hereinafter be described, by way of example only, with reference to the accompanying drawings, wherein.

DETAILED DESCRIPTION OF ILLUSTRATED EMBODIMENT

Figure 1:
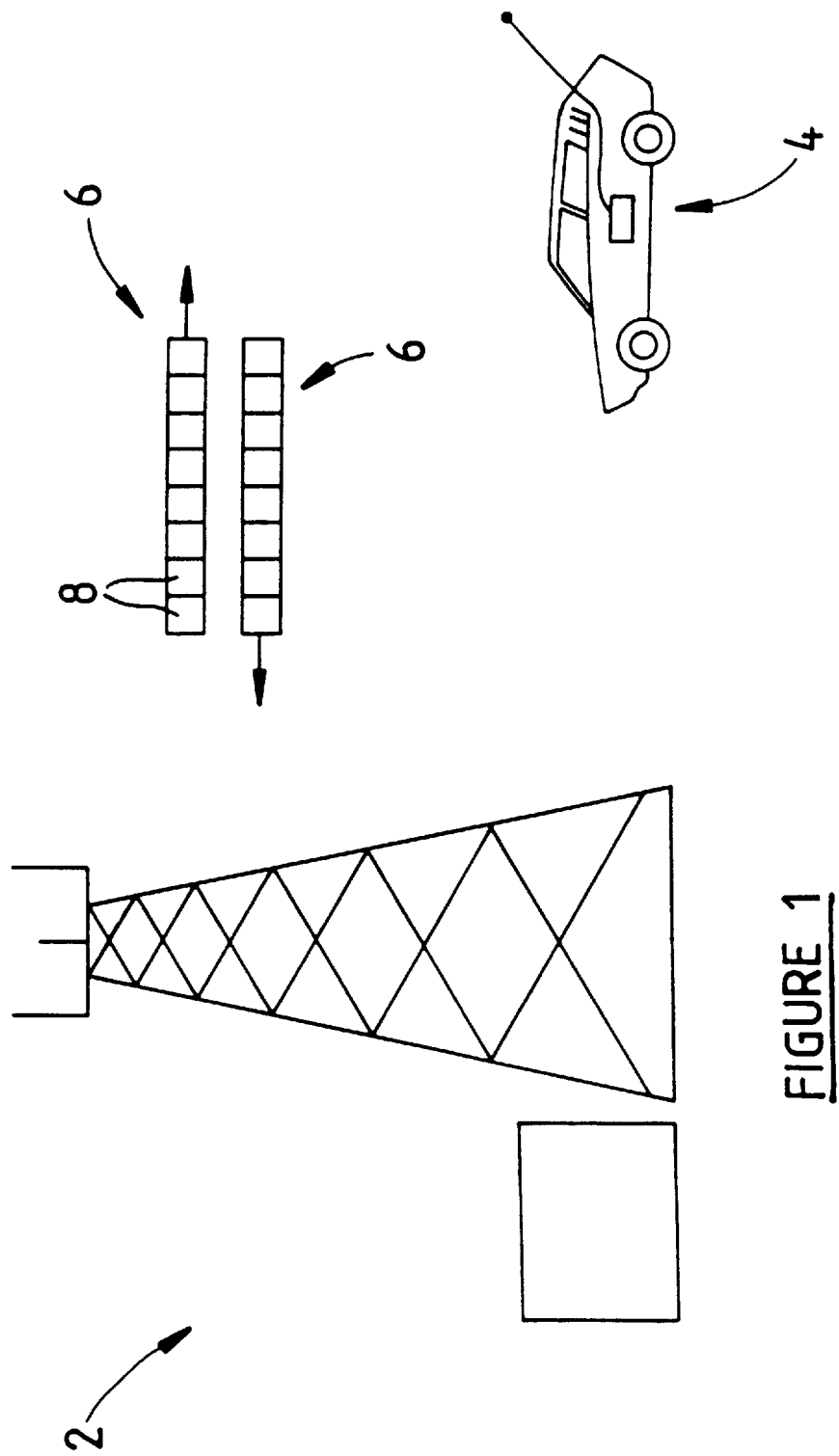
FIG. 1 is a diagram of a base station and mobile station of the GSM system.
Figure 2:
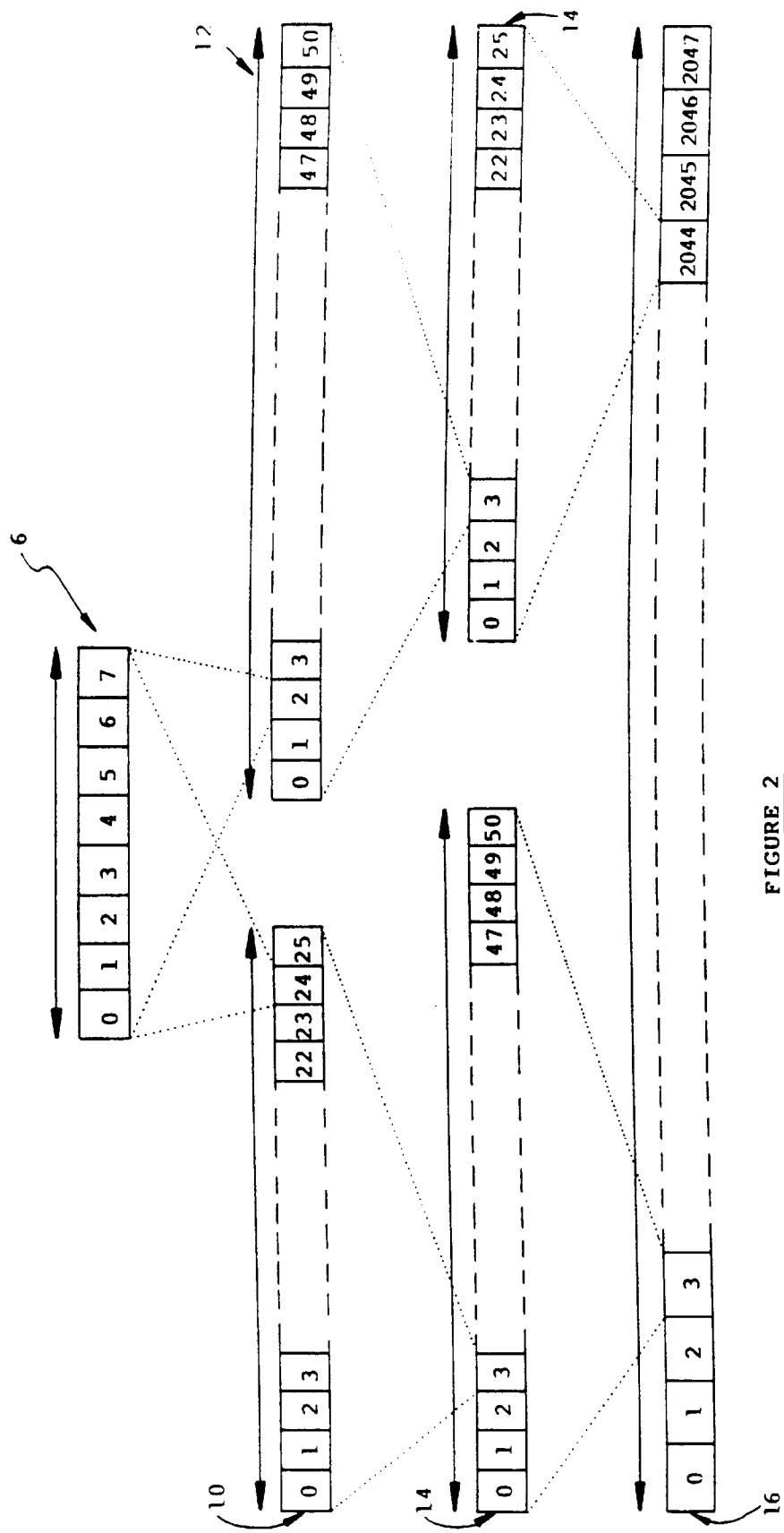
FIG. 2 is a diagram of the physical frame structure of the GSM system.

Communication between a base station 2 and a mobile station 4 of the GSM system involves the transmission of TDMA frames 6 which are each divided into eight 577 $\mu$s timeslots 8 which are referred to as physical channels. The frames 6 are transmitted at a set carrier frequency, and transmission from the mobile station 4 to the base station 2 is referred to as the uplink, and transmission from the base station 2 to the mobile station 4 is referred to as the downlink. Information sent during one timeslot 8 is called a burst. Different logical channels are mapped onto the physical channels, of which these are two main types, a traffic channel and a control channel. A traffic channel multiframe 10, as shown in FIG. 2, comprises 26 TDMA frames 6, and a control channel multiframe 12 comprises 51 TDMA frames 6. The multiframes 10 and 12 can then be formed into superframes 14, which comprise 1326 TDMA frames 6. The superframes in turn can be combined to form a hyperframe 16 which includes 2048 superframes.

The logical channels may be used for communication on a point-to-point basis, i.e. for the base station 2 to one mobile station 4, such as the traffic channels (TCH) or on a point-to-multipoint basis, i.e. from the base station 2 to several mobile stations 4. The control channels are used to carry signalling and synchronisation data and are divided into three types, broadcast, common and dedicated control channels. These channels are further subdivided as follows:

Broadcast channels (BCH).

Frequency correction channel (FCCH): This channel carries information for frequency correction of a MS. The channel is for the downlink and point-to-multipoint.

Synchronisation channel (SCH): This channel carries information for frame synchronisation (TDMA frame number) of a MS and the identification of a BS by a base station identification code (BSIC). The channel is for the downlink and point-to-multipoint.

Broadcast control channel (BCCH): This channel broadcasts general information on a per BS basis, i.e. cell specific information. The channel is for the downlink and point-to-multipoint.

Common control channels (CCCH).

Paging channel (PCH): This channel is used to page or search for a MS. The channel is for the downlink and point-to-point.

Random access channel (RACH): This channel is used by an MS to request allocation of a SDCCH, either as a page response or to access the system for call origination/registration. The channel is for the uplink and point-to-point.

Access grant channel (AGCH): This channel is used to allocate a SDCCH or directly a TCH to a MS. The channel also allocates an initial timing advance TA. The channel is for the downlink and point-to-point.

Dedicated control channels (DCCH).

Stand alone dedicated control channel (SDCCH) is used for system signalling during a call set-up before allocation of a TCH is done. For example, registration and authentication takes place on the channel. The channel is for the up/downlink and point-to-point.

Slow associated control channel (SACCH) is associated to a TCH or a SDCCH. It is a continuous data channel carrying continuous information such as measurement reports from the mobile of received signal strength for present and adjacent cells. This is a necessity for the mobile assisted handover function, discussed hereinafter. The channel is also used for power regulation of the MS and to assign a timing advance TA for time alignment. The channel is for the up/downlink and point-to-point.

Fast associated control channel (FACCH) is associated to 2 TCH. FACCH works in a stealing mode. This means that if suddenly during a speech transmission it is necessary to exchange signalling information with the system at a rate much higher than the SACCH can handle, then 20 ms speech (data) bursts are stolen for signalling purpose. This is the case at handover. The input will not be heard by the user while a speech decoder replaces the missing 20 ms speech with an interpolated sequence instead.

Figure 3:
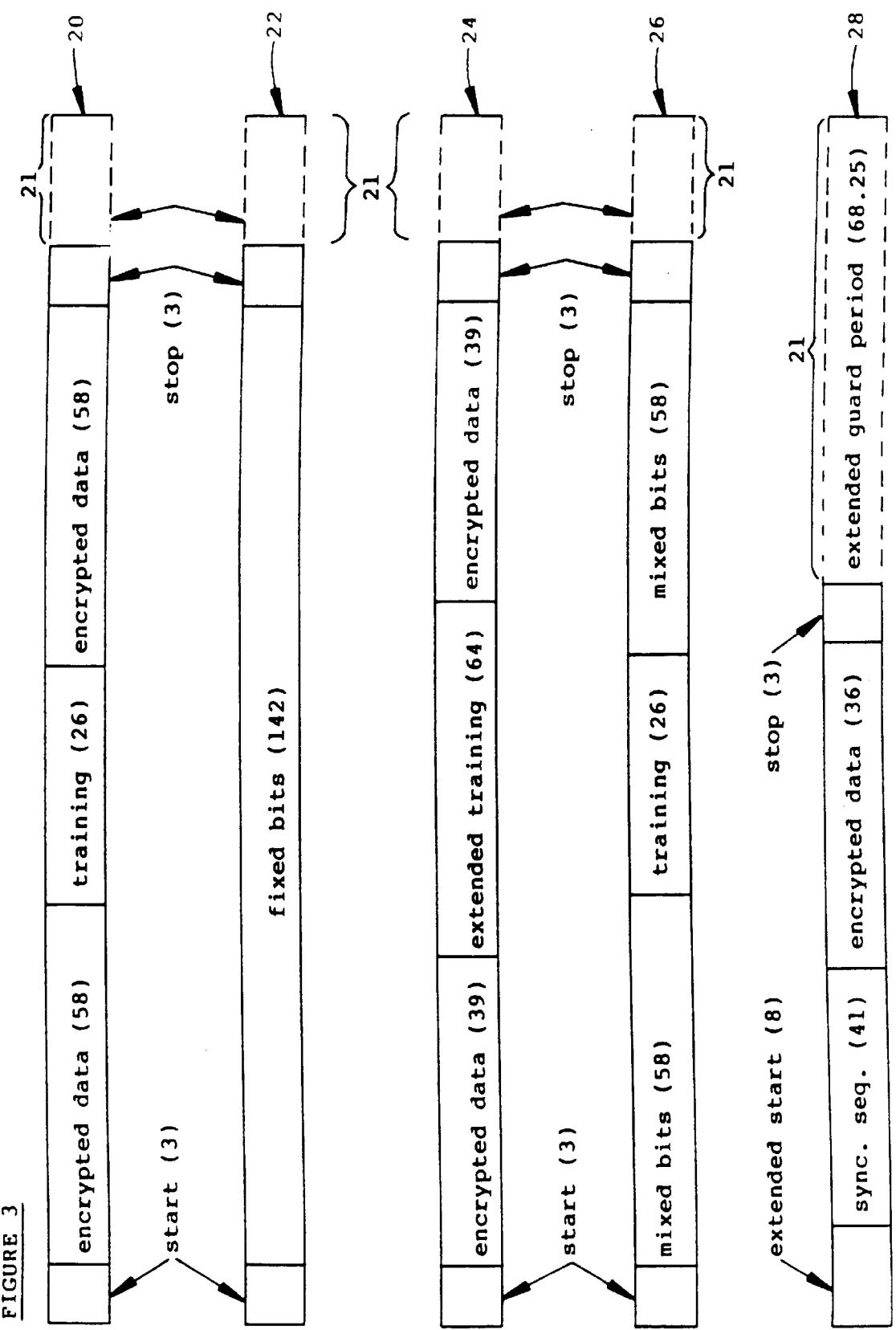
FIG. 3 is a diagram of bursts of the GSM system.

There are five different types of bursts 20 to 28 used in the GSM which each comprise 156.25 bits transmitted in 577 $\mu$s, as shown in FIG. 3. The bursts include a data containing part and a guard period 21. The guard period 21 is used to allow for variation of the time of arrival of a burst without adjacent bursts received one after the other having their data containing parts overlapped. An adaptive time alignment system, described hereinafter, using the timing advance TA is also used by the mobile station 4, for all bursts except the initial access bursts, to vary the time of transmission of bursts so they arrive at the base station 2 at the required time without any damaging overlap.

A normal burst 20 is used to carry information on the traffic channels TCH and all control channels, except for RACH, SCH and FCCH. The normal burst 20 includes three start bits, 116 encrypted data bits, 8.25 bits in the guard period 21 at the end of the burst and a 26 bit training sequence used for RF channel equalisation, discussed hereinafter.

A frequency correction burst 22 has the same guard period and start and stop bits as a normal burst 20 however the remaining 142 bits include a fixed series of known bits. The burst 22 is used for frequency synchronisation of the mobile station 4. Repetitions of the frequency correction burst 22 form the frequency correction channel FCCH.

A synchronisation burst 24 is sued for time synchronisation of the mobile station 4. The synchronisation burst 24 is the same as the normal burst 20, except it includes an extended training sequence of 64 bits and reduced set of encrypted data bits. Repetitions of the synchronisation burst 24 from the synchronisation channel SCH.

A dummy burst 26 has the same format as a normal burst 20, except is does not carry any data and includes a known set of mixed bits instead of the encrypted data. A dummy burst 26 is used in placed of a normal burst 20 when no data is required.

An access burst 28 is used by the mobile station 4 to access the GSM system. The burst 28 includes an extended start sequence, a synchronisation sequence, 36 bits of encrypted data, three stop bits and an extended guard period 21 of 68.25 bits. The longer guard period caters for burst transmission from a mobile station 4 which does not know the timing advance TA at the first access, or after handover to a new base station 2. Repetitions of the access burst 28 from the random access channel RACH.

Figure 4:
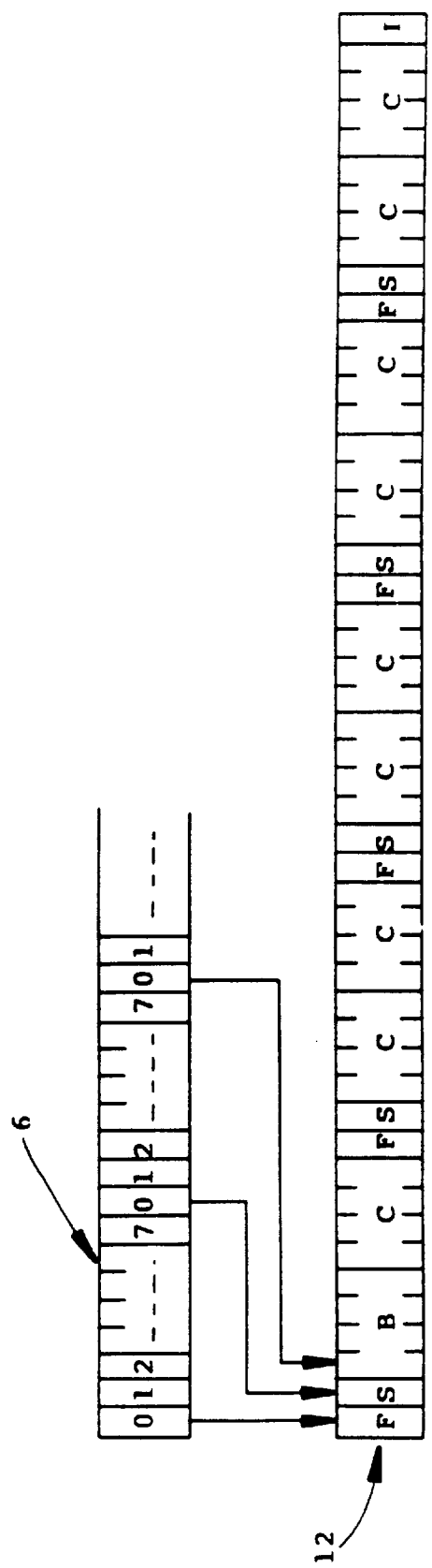
FIG. 4 is a diagram illustrating mapping of a control channel multiframe to timeslot 0.

The logical channels, as discussed previously, are mapped onto the physical channels. Most of the control channels are mapped onto timeslot 0 for the downlink, as shown in FIG. 4, which illustrates how each channel of a control channel multiframe 12 is mapped onto timeslot 0 of a sequence of TDMA frames 6, where:

F is FCCH: Here the mobile synchronises its frequency.
S is SCH: The mobile reads the TDMA flame number and BSIC.
B is BCCH: The mobile reads general information about this cell.
C is CCCH: A mobile can be paged or allocated a SDCCH.
I is IDLE: An IDLE frame where nothing is sent.

Figure 5:
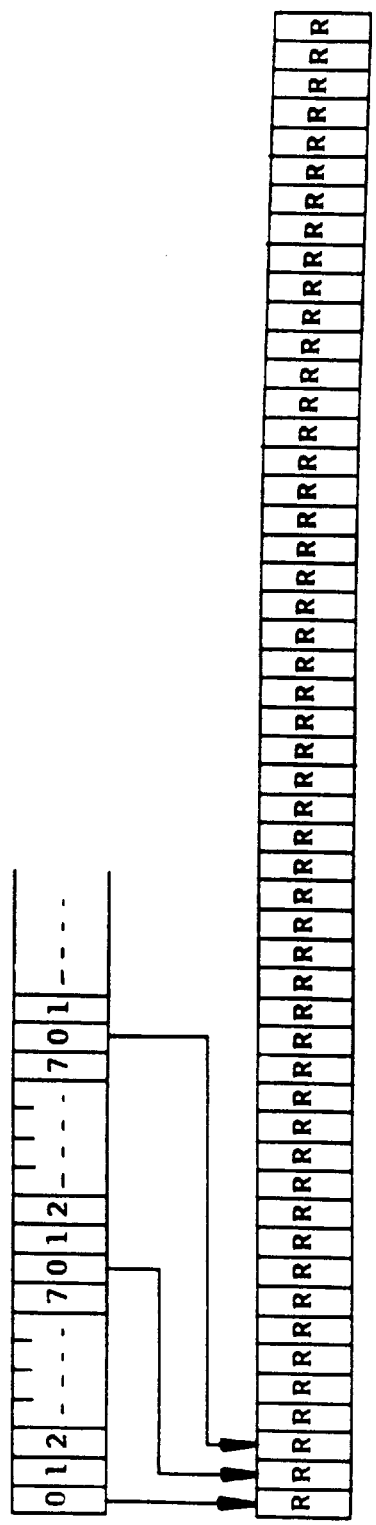
FIG. 5 is a diagram illustrating mapping of a random access channel to timeslot 0.
Figure 6:
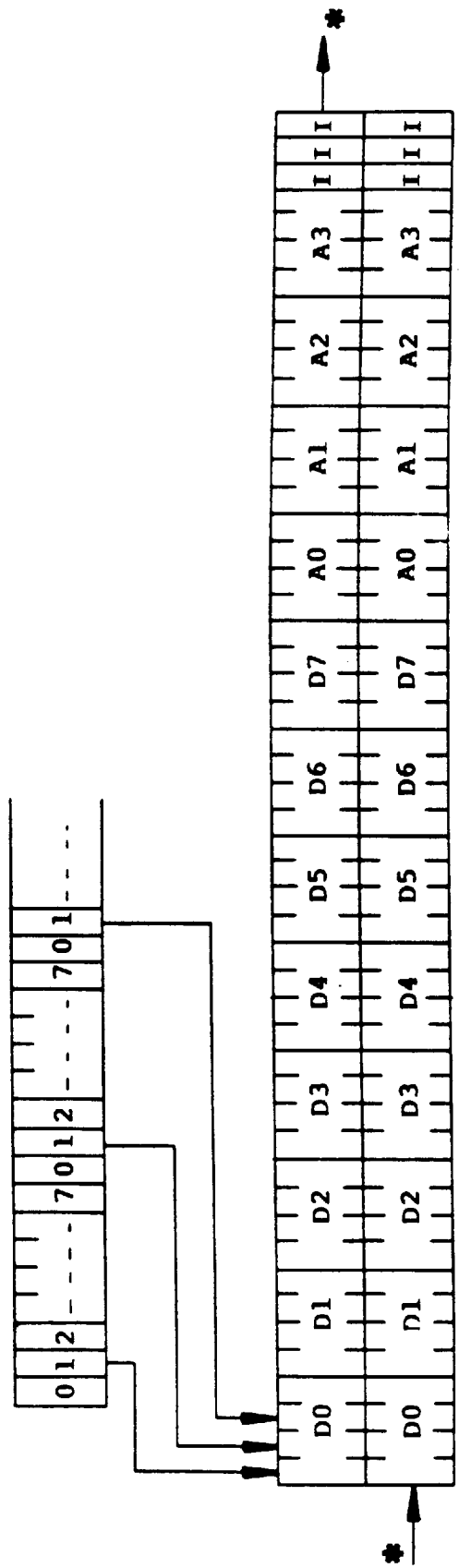
FIG. 6 is a diagram illustrating mapping of downlink SDCCH and SACCH to timeslot 1.
Figure 7:
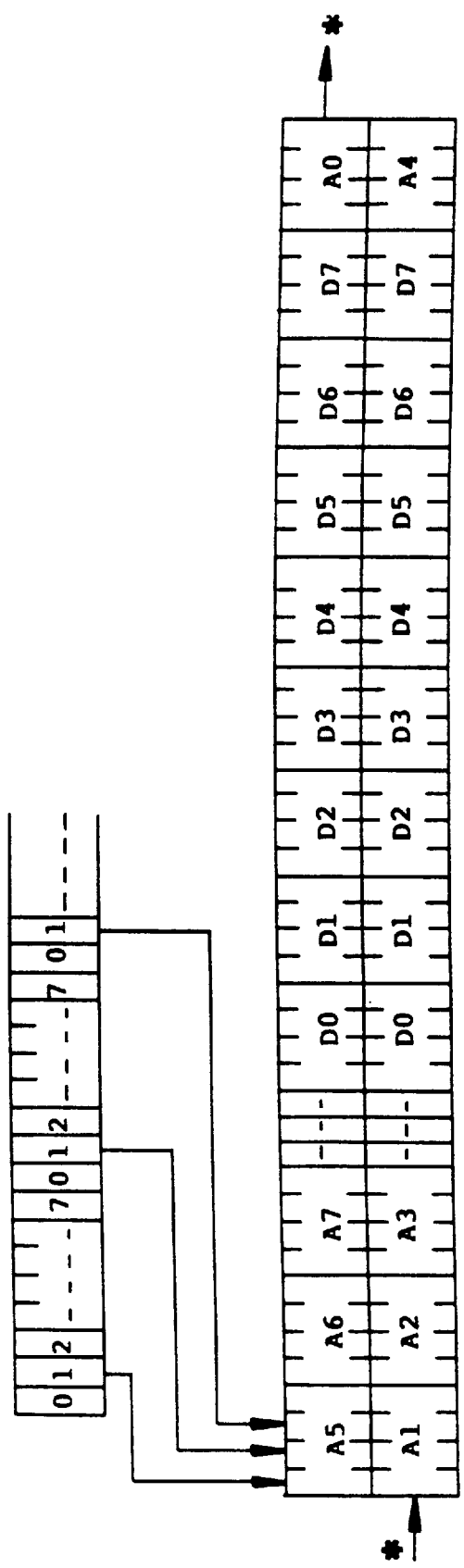
FIG. 7 is a diagram illustrating mapping of uplink SDCCH and SACCH to timeslot 1.

FIG. 5 shows how the random access channel RACH of the uplink is mapped onto timeslot 0. The SDCCH and SACCH can be mapped onto timeslot 1 of the TDMA frame 6, as shown in FIG. 6 for the downlink and FIG. 7 for the uplink, where the Dx channels from the SDCCH and Ax channels from the SACCH, as follows:

Dx (SDCCH): Here, a "mobile x" which is setting up a call or updating exchanges systems parameters with the GSM network. Dx is used only for "mobile x" during the call set-up and is available of another MS only after "mobile x" has moved to a TCH to start the call or released it after registration.
Ax (SACCH): Control signalling is also exchanged during the set-up phase of the transmission (a handover might be required) and this is done using this channel for "mobile x".

Figure 8:
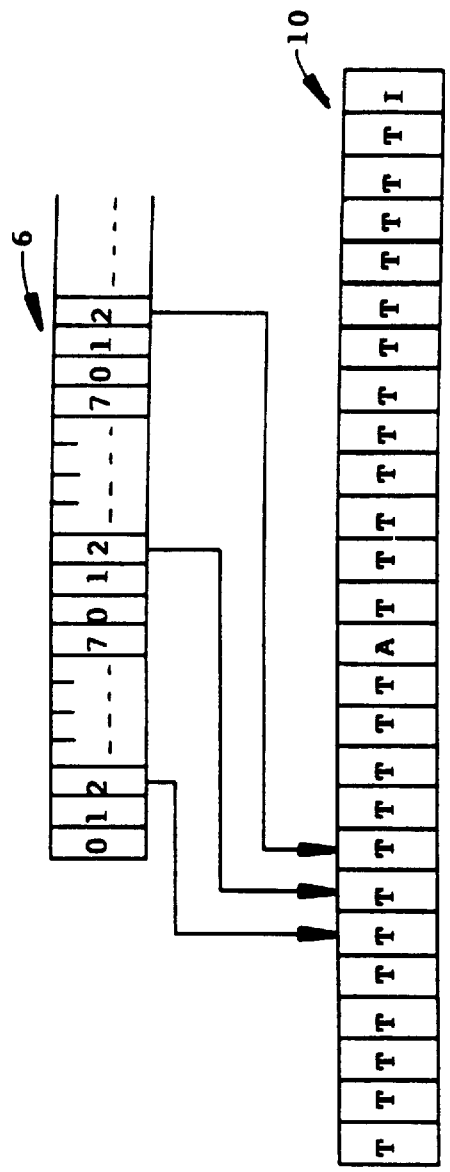
FIG. 8 is a diagram illustrating mapping of a traffic channel to timeslot 2.

The remaining six timeslots, timeslots 2 to 7, are available for use as traffic channels. Seven timeslots, TS 1 to TS 7, can be made available for use as traffic channels by using a combined control channel option where SDCCH and SACCH are also mapped onto TS 0. The mapping of a traffic channel multiframe 10 to timeslot 2 of the TDMA frame 6 is illustrated in FIG. 8, where:

T is TCH: Contains encoded speech or data of a call.
A is SACCH: Control signalling.

I is IDLE: An IDLE frame where nothing is sent.

Figure 9:
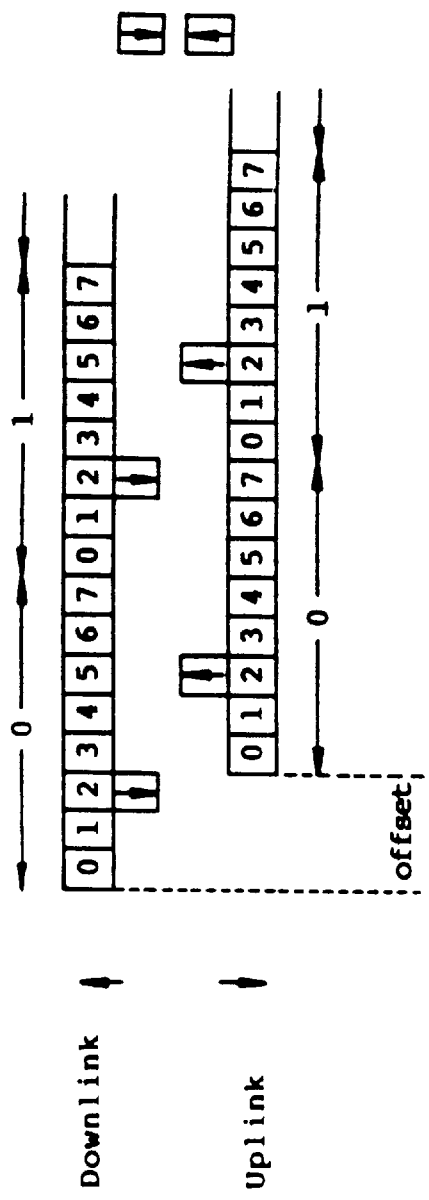
FIG. 9 is a diagram illustrating the time stagger between frames of the uplink and frames of the downlink.

The only difference between traffic channels on the uplink as opposed to the downlink is the fact that the uplink channels are delayed by the three timeslots, because all TDMA frames 6 transmitted on the uplink from the mobile station 4 to the base station 2 are delayed by three timeslots, as shown in FIG. 9.

On switching on a mobile station 4, the mobile searches base stations 2 by searching for carriers of the BCCH channel and selects the strongest one. The mobile scans all 124 RF channels in the GSM system and calculates average levels for each of them. The mobile tunes to the strongest carrier and finds out if it is a BCCH carrier. If so, the mobile reads BCCH-data to find out if the cell can be locked to. Otherwise the mobile tunes to the second strongest carrier etc. The mobile may optionally include a BCCH carrier memory and in that case it will only have to search these carriers. If this ends unsuccessfully, the mobile selects the strongest BCCH carrier as above.

The mobile station, whilst in idle mode, is informed on the BCCH which BCCH carriers it is to monitor for cell re-selection purposes, i.e. for locking to another BS. Measurements on surrounding cells during a call take place when the mobile is not doing anything else, i.e. between transmission and reception of the allocated timeslot. The signal strength of the serving cell or base station is monitored during the reception of the timeslot allocated to the mobile. On SACCH, the mobile is informed which BCCH carriers are to be monitored for handover purposes, so the signal strength of these are measured one by one. The working schedule is: transmit—measure—receive—tramsmit—measure—receive, and so on. A list of the six carriers is updated regularly by the mobile as a result of the measurements. During a call, the mobile is continuously (via SACCH) reporting to the system how strong the received signal strength is from the BS 2 and its surrounding base stations. These measurements are used by the BS to make decisions on target cells when a handover is required.

Figure 10:
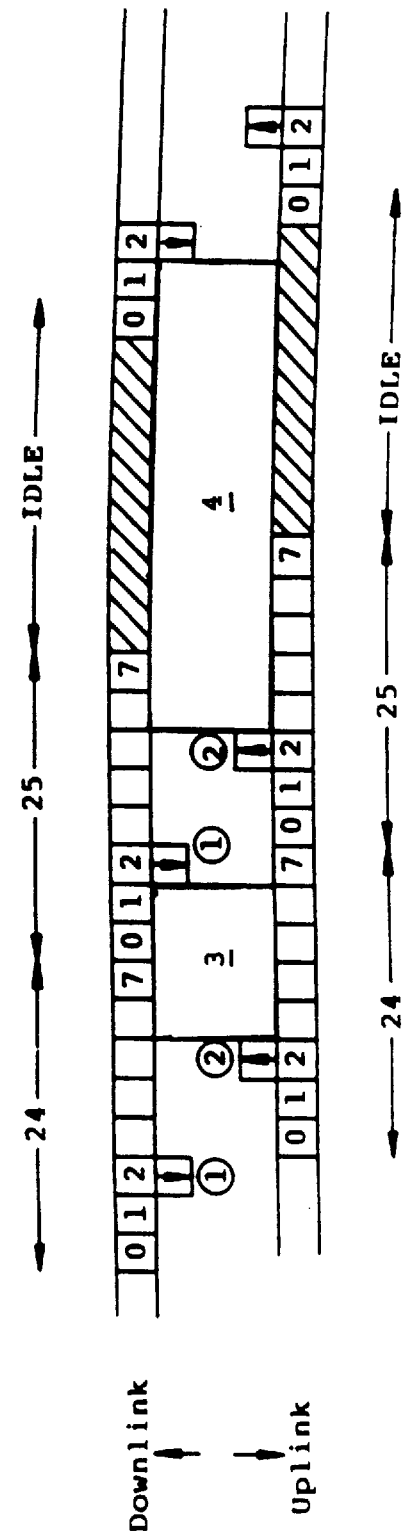
FIG. 10 is a timing diagram illustrating measurement of the signal strength of BCCH carriers of base stations.

A mean value of the measurements for each carrier is then derived and reported to the BS. To be sure that the measured values corresponds with the proper BS, the identity of a BS is given by the BSIC, sent on SCH on TS 0. So during the IDLE frame on the TCH (TDMA frame 26 on the TCH) the BSIC for adjacent base stations are checked. The timing of events is illustrated in FIG. 10, where:

1. Downlink TS 2, MS receives and measures signal strength on the serving cell.
2. Uplink TS 2, MS transmits.
3. Uplink TS 2 to TS 6, MS measures signal strength for at least one of the surrounding cells.
4. Uplink TS 2 to TS 6 and IDLE frame, MS reads BSIC on SCH (TS 0) for one of the surrounding cells.

The six adjacent cells with highest mean signal strength value and valid BSICs are then reported via SACCH to the serving BS 2.

Since the MS might not be synchronised with an adjacent cell for which is trying to determine the identity, the MS does not know when TS 0 on that adjacent BCCH carrier will occur. Therefore it has to measure over a time period of at least eight timeslots to be sure than TS 0 will occur during the measurement. This is accomplished with the IDLE frame as shown in FIG. 10.

After finding the strongest BCCH carrier during power on the mobile station 4 synchronises to it by reading the FCCH.

To find the identity of the BS and synchronize to the TDMA frame number of a hyperframe, the mobile reads the SCH. Before call processing can begin, a significant amount of general system information needs to be accessed by mobile station 4, such as neighbour cell description, frequencies used in the current cell mobile country and network codes etc. The mobile station 4 accesses the BCCH to acquire this information.

The mobile station then has to register with the system so as to advise of its location and inform that it has switched on. The mobile station sends an access request message on the RACH. The base station then allocates a SDCCH to the mobile via AGCH. Registration is performed on the DSCCH with control signalling on SACCH. The mobile returns to an idle mode, and is now able to access the system for a call or be paged to receive a call. In idle mode, the mobile station listens to the BCCH and the CCCH.

To page the mobile station to answer a call, the base station 2 uses the PCH. The mobile responds to sending a page response message on RACH, and the base station 2 then allocates a SDCCH to the mobile via the AGCH. The base station 2 and the mobile station 4 then exchange the information required to establish the call, such as authentication, ciphering mode, mobile station identity etc. Signal strength measurement reports and power control are sent on SACCH. On completing the call set-up procedure to establish the call, the mobile is allocated a TCH, and the call is started on the TCH.

For the mobile station 4 to access the system to make a call, the mobile sends an access request message on RACH. The base station 2 then allocates an SDCCH to the mobile via the AGCH. The call set-up information, described above, is then exchanged on the SDCCH, with control signalling on the SACCH. Upon allocation of a TCH, the call is started on the TCH.

Mobile stations 4 not only measure the received signal level from the serving base station 2, but also the received signal quality. The received signal quality is measured in terms of the channel raw bit error ratio, which is a logarithmically quantised into a 3 bit error code and within a nominal range of 0.1–18% bit error ratio. Similar measurements of the signal level and quality of the uplink are also performed by the base station 2.

On the basis of the signal level and quality measurements, it is possible to distinguish degraded communication due to co-channel or adjacent channel interference and that due to insufficient signal strength. The mobile station 4 and the base station 2 can then use both measurements as a basis for effecting handover to a channel on a new base station, known as inter cell handover. The GSM recommendations do not stipulate how the measurements should be used to determine when handover should be effected, but does give an example algorithm in recommendation 05.08 for making a determination as to when handover should be executed.

The base station 2 may also perform measurements on the received signal strength for unused timeslots which is able to provide a direct measure of the interference of those timeslots. This can be used as a basis for the base station 2 to handover a mobile station 4 to a new and better quality channel on the same base station 2, which is known as intra cell handover.

Once a decision has been made to perform an inter cell or intra cell handover, the base station 2 selects a new transceiver and timeslot for the current traffic channel. For inter cell handover, the transceiver will be on a new adjacent base station, whereas for intra cell handover, the transceiver is one of the current base station. The base station 2 instructs the mobile station 4 using the FACCH to tune to the selected timeslot and the carrier frequency of the selected transceiver. The mobile station 4 moves to that transceiver and carrier frequency and then transmits a random access burst on a TCH using a new timeslot and carrier. On successfully receiving the random access burst on the TCH, the receiving base station 2 then transmits a confirmation on the TCH back to the mobile station 4. On receiving the confirmation, the mobile station resumes the call on the TCH. A detailed description of protocols for executing inter cell and intra cell handover is provided in GSM Recommendation 04.08.

Figure 11:
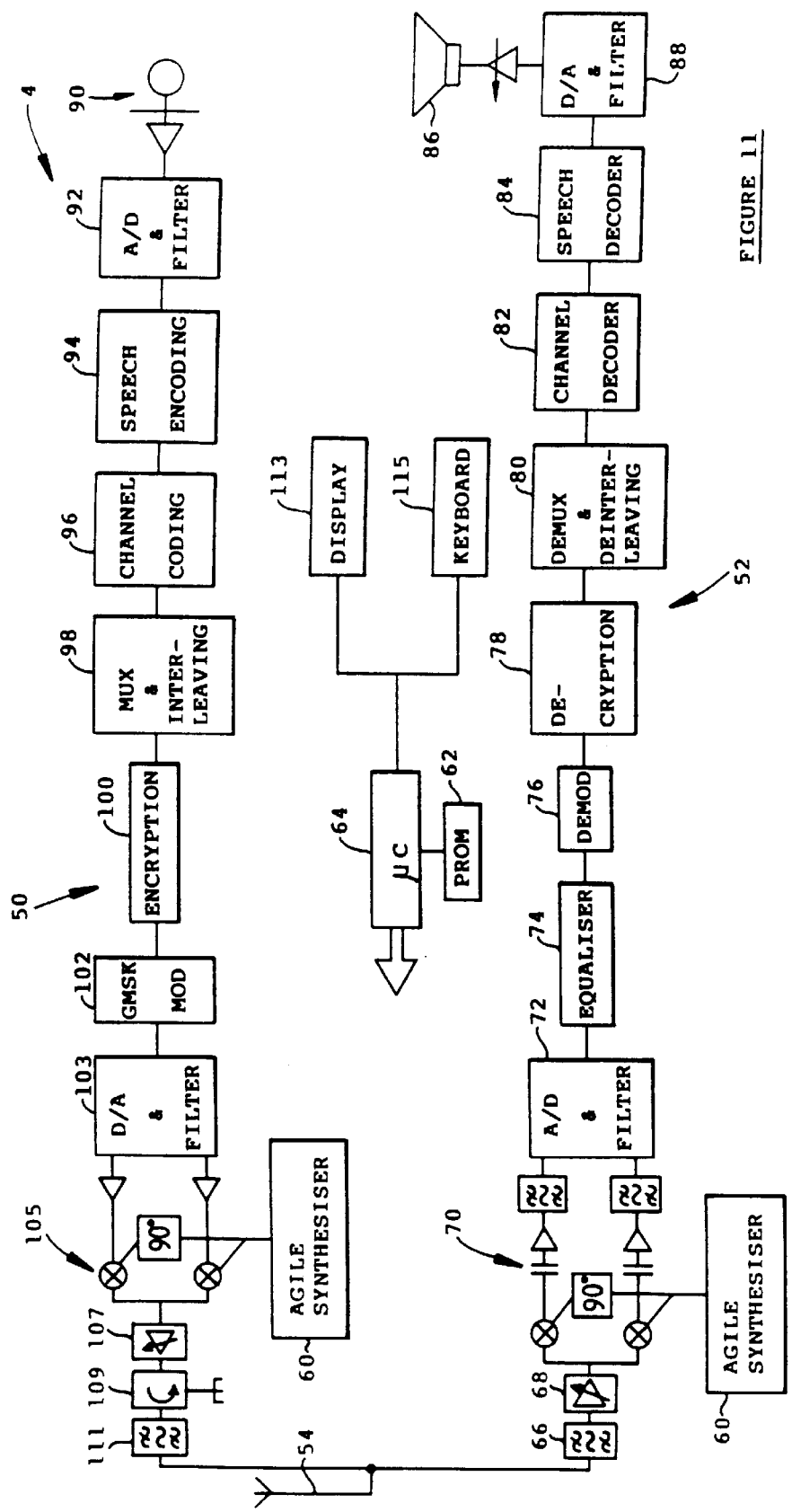
FIG. 11 is a block diagram of a mobile station.

A mobile station 4, as shown in FIG. 11, includes a transmitter stage 50 and a receiver stage 52 which are both connected to the antenna 54 of the station 4. The carrier frequency for the transmitter 50 and the receiver 52 is determined by the output of an agile synthesiser 60 which operates on instructions provided by a microcontroller 64, which in turn operates on the basis of control softward held in a PROM 62. The microcontroller 64 is able to use the synthesiser 60 to scan through all of the available RF channels of the GSM system for BCCH carriers.

The receiver stage 52 includes a band pass filter 66 which is connected to the antenna 54. Signals received on the antenna 54 which are output by the band pass filter 66 are amplified by an amplifier 68 and passed to a down-converter 70 which multiplies the signals with the output of the synthesiser 60 so as to provide modulated signals of a low frequency. The modulated signals are converted to digital samples by a filter and analogue to digital converter 72. An equaliser 74 receives the digital samples and reconstructs all of the channels received on the basis of the change which has occurred in the training sequence bits received. The signals are then demodulated by a demodulator 76, decrypted by a decryptor 78, and the TDMA frames are demultiplexed and deinterleaved by a demultiplexer 80. A channel decoder 82 selects the decodes the desired traffic channel from the demultiplexed TDMA frames and the speech data extracted is decoded by a speech decoder 84 into linear digital speech samples. The speech samples are converted to analogue form for output to a speaker 86 of the station 4 by a filter and digital to analogue converter 88. Control channels accessed by the channel decoder 82 are used to provide instructions to the microcontroller 64.

Speech signals received by the microphone 90 of the station 4 are converted to digital linear samples by a filter and analogue to digital converter 92. The speech samples are encoded by a speech encoder 94 to comply with the GSM bit rate and a traffic channel with the encoded speech is formed by a channel coder 96. Channels formed by the channel coder 96 are multiplexed and interleaved into TDMA frames by a multiplexer 98. The TDMA frames are encrypted by an encryptor 100 and modulated by a GMSK modulator 102. The GMSK modulator 102 performs Gaussian minimum shift keying modulation on the digital signals received. The output of the modulator 102 is converted to an analogue form by a filter and digital to analogue converter 103. The low frequency modulated signal output by the converter 103 is multiplied with the output of the agile synthesiser 60 by an up-converter 105 so as to form a modulated signal having the desired carrier frequency for transmission on the antenna 54. The modulated signal is amplified, prior to transmission, by an amplifier 107 and passes via an isolator 109 and a band pass filter 111.

In addition to controlling all of the digital signal processing components discussed above, the microcontroller 64 further controls the display 113 and keyboard 115 of the station 4, and is responsive to control signals generated by depressing keys of the keyboard 115.

Figure 12:
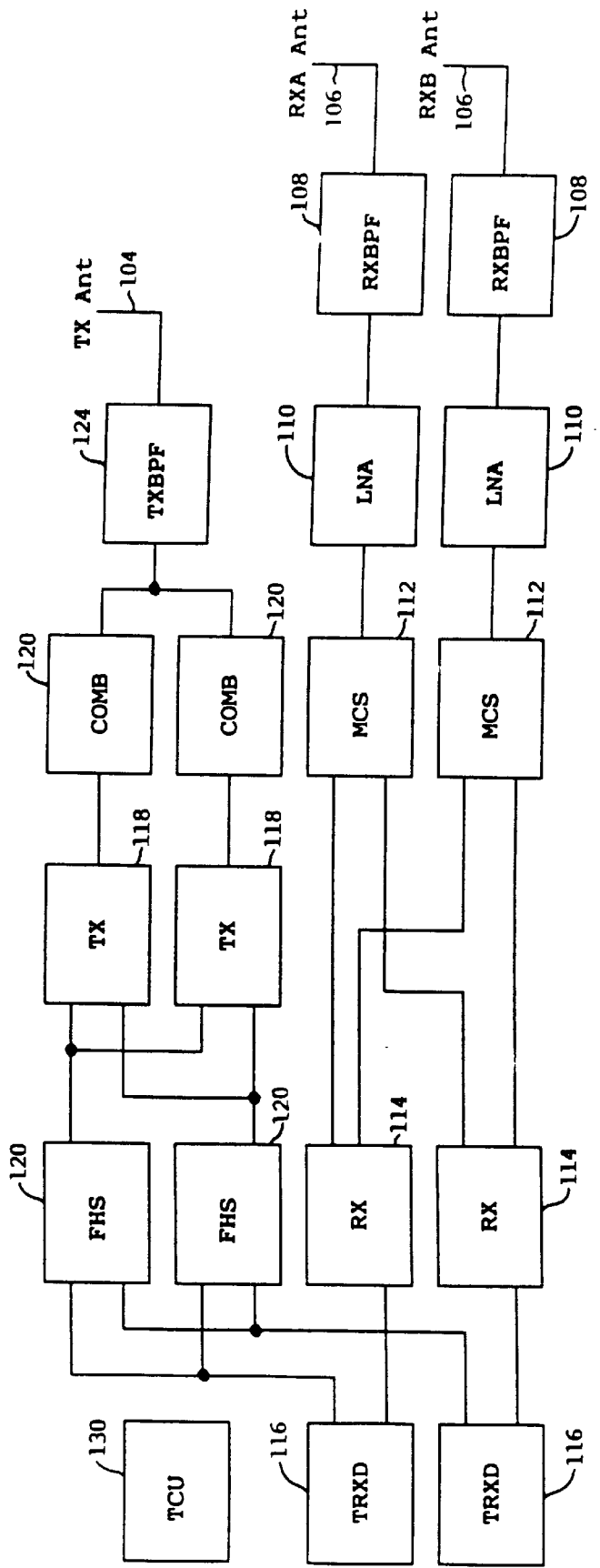
FIG. 12 is a block diagram of a base station.

A GSM base station 2, as shown in FIG. 12, as shown in FIG. 12, includes a number of transceivers operating at different carrier frequencies and connected to the same transmitter antenna 104 and two receiver antennas 106. The receiver antennas 106 are arranged in a space diversity configuration to receive the signals transmitted within the cell of the station 2. The receiver antennas 106 are connected to respective band pass filters 108 which provide their output to respective low noise amplifiers 110. The amplifiers 110 amplify the received antenna signal and pass it to respective multicoupler splitters 112 which produce sixteen copies of the received antenna signal for each antenna 106. All of the signals are provided to radio receivers 114 which form part of respective digital transceivers 116. A radio receiver 114 is used to select frequency channels and down-convert and demodulate the received radio frequency signals on a channel into digital information for its digital transceiver 116. The digital transceivers 116 are used to equalise, deinterleave, demultiplex and channel decode the received TDMA frames 6 and either act on the information contained in the frames or place the information in a format for transmission to a base station controller and then to a mobile switching centre.

For data to be transmitted to a mobile station 4, the data is placed in the TDMA frame structure of the GSM system by a digital transceiver 116 and outputted to one of a number of radio transmitters 118. A radio transmitter 118 is used to modulate and up-convert the digital information into amplified radio signals with a respective carrier frequency and a set power. The digital signals are provided to the transmitters 118 via frequency hopping switches 120 which can be used, if desired, to perform frequency hopping between carrier frequencies. The outputs of the radio transmitters 118 are connected to respective combiners 120, which perform filter functions to combine the radio signals to one radio output. The radio output is passed via a transmitter band pass filter 124 for output on the transmitter antenna 104.

A timing clock unit 130 is used to provide synchronisation signals for the radio transmitters 118 and the digital transceivers 116. The digital transceivers 116 are controlled by a transceiver controller which also controls resources shard between all transceivers. A transceiver is considered a logical system unit of the base station 2 including a receiver 114 and transmitter 118 and which is able to transmit and receive up to eight physical channels on different timeslots and on one radio frequency carrier.

GSM mobile stations 4 are produced by a number of telecommunications manufacturers, such as Alcatel, Radiotelephone of France, L. M. Ericsson, Nokia Telecommunications of Finland and Motorola. Base stations 2 are also produced by the same telecommunications manufacturers, one example being the RBS 200 R1 GSM base station produced by L. M. Ericsson Australia.

The three timeslot delay between bursts transmitted on the downlink and those transmitted on the uplink, described previously with reference to FIG. 9, is precisely the delay which occurs when the mobile station 4 is very close to the base station 2. To ensure the three timeslot stagger is maintained as the mobile station 4 moves away from the base station 2, the GSM system uses the adaptive time alignment scheme to ensure the mobile station 2 transmits its bursts at an advance time in order to maintain the burst position within the TDMA frame sequence expected at the base station 2. This is achieved by the base station 4 providing the mobile station 2 with a timing advance TA number which indicates the number of bits in advance which the mobile station should transmit its bursts. The correct TA is initially determined during the call set-up procedure on the basis of the time at which the base station 2 receives the access burst 28 on the RACH. The TA calculated is provided to the mobile station 4 in the AGCH has a 6 bit number during set-up procedure. With a TCH established, the BS 2 then monitors any delay from the mobile station and if the delay changes by more then one bit period, the TA is advanced or retarded accordingly by one bit and the new value provided to the mobile station 4 on the downlink SACCH. With a TA represented by 6 bits, the range of the TA which the mobile station 4 can be instructed to invoke is between 0 bits and 63 bits, in increments or decrements of 1 bit, where the bit period is 3.69 $\mu$s. A TA of 0 bits is used for a mobile station 4 very close to the base station 2, and a TA of 63 bits is used for a mobile station 2 which is at a distance from the base station 2 which corresponds to the maximum radius of the cell. With a bit period of 3.69 $\mu$s, a 63 bit timing advance corresponds to 232.6 $\mu$s, which is the time taken to travel a round trip radio propagation distance of 69.8 km. Hence, the maximum cell radius which can be supported by a GSM base station 2 is 34.9 km. The number of bits which a burst is advanced each correspond to a distance of approximately 550 m between the mobile station 4 and the base station 2.

One logical method of increasing the base station cell radius beyond the 35 km limit would be simply to increase the number of TA bits for 6 to 7 and therefore represent a timing advance within the range of 0 to 127 bits. This however has the disadvantage that alternations need to be made to all mobile stations so as to be able to recognise and use a 7 bit TA instead of a 6 bit TA and this would require an alteration to the programming of mobile stations 4 and a departure from the GSM recommendations which is not prudent or practical.

Alternatively, the mobile station can be instructed to simply increase its TA one bit at a time to enable it to travel into areas which exceed the standard cell radius of 35 km. However, an initial TA will still need to be assigned when accessing the GSM network or during handover, and the technique would still require a change to programming of the mobile stations 4.

Another method of extending the cell radius, is to utilise only every second timeslot whilst every other timeslot is left vacant or empty. When the mobile station 4 reaches a distance of 35 km, the TA of the mobile would remain at 63 whilst it continues to travel further away from the base station 2. The signal received at the base station 2 would therefore be allowed to drift into the next vacant timeslot. The receiver at the base station 2 would need to be adjusted so it can successfully synchronise and decode received bursts with the additional delay. Timeslot TS 1 would be left vacant to enable the receiver to lock onto and decode random accesses in TS 0 which have been delayed. This method however has the disadvantage that the capacity of the main transceiver at the base station 2 would be reduced by half, with the mapping of logical channels to physical channels as being follows:

| | |
|---|---|
| TS 0: | BCCH and SDCCH |
| TS 1: | Vacant |
| TS 2: | TCH |
| TS 3: | Vacant |
| TS 4: | TCH |
| TS 5: | Vacant |
| TS 6: | TCH |
| TS 7: | Vacant |

Any additional transceivers of the base station, which do not need to utilise the control channels, would have a capacity of four TCH.

Figure 13:
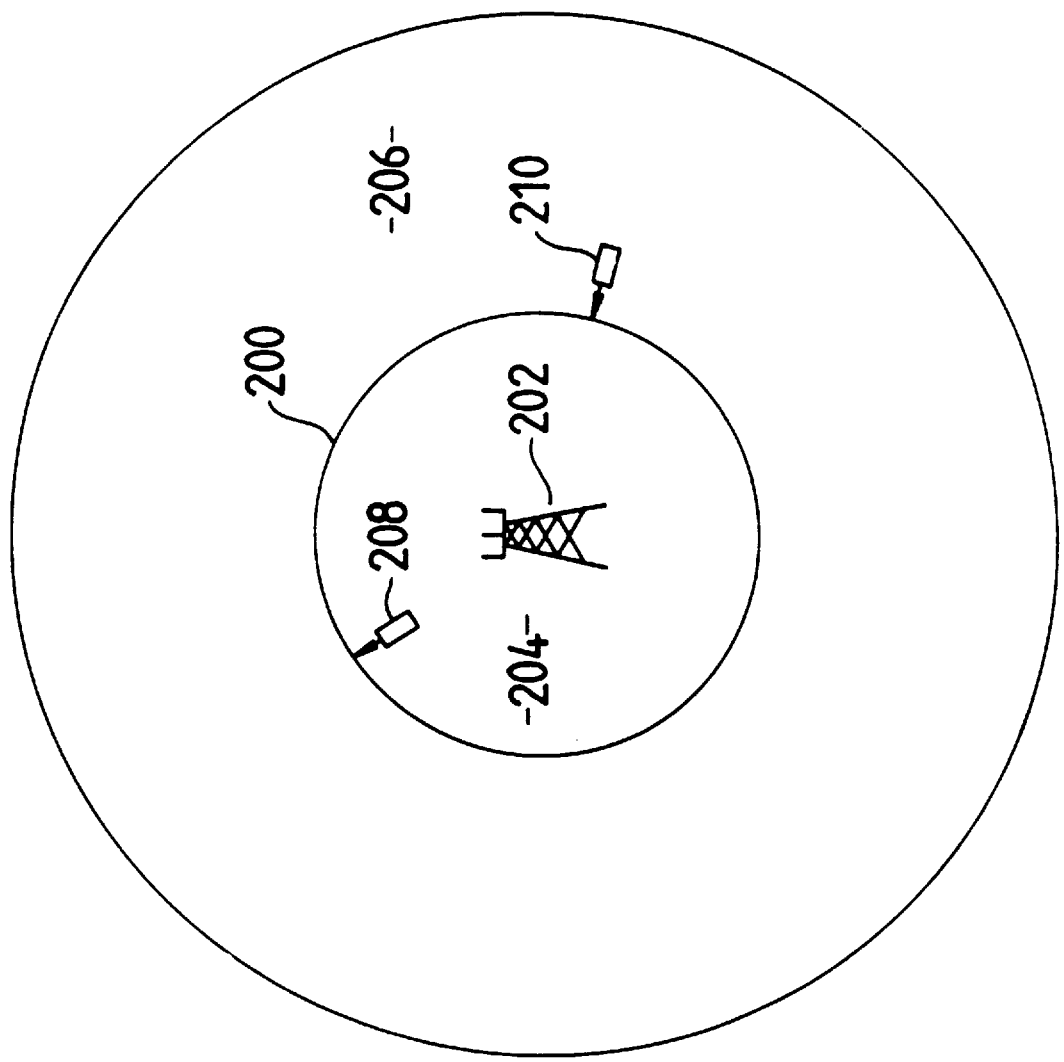
FIG. 13 is a diagram illustrating extended cell coverage for a base station.

A third method, according to a preferred embodiment of the present invention, involves a first transceiver of a base station 202 being allocated to communicate with mobile stations 4 within the standard 35 km cell radius, and a second transceiver of the base station 202 being assigned to communicate with mobile stations beyond the cell radius of 35 km, and between a cell radius range of 35–70 km. A mobile station 4 which crosses the 35 km boundary 200, as shown in FIG. 13, during a call between an inner cell area 204, comprising the 0–35 km band, and an outer cell area 206, comprising the 35–70 km and, will invoke an intra cell handover from one transceiver to the other. The base station 202 is the same as the base station 2 described previously, except the second transceiver is adjusted so as to synchronise to bursts from mobile stations which are delayed by having to travel at least 35 km. Control of the base station 202 is also altered to affect the intra cell handover at the boundary 200 and invoke the distance allocation. The first transceiver functions as in the standard base station 2, and the second transceiver also functions as if it was normally handling communications from mobile stations within a 35 km band. No alteration is required to the mobile stations 2 as both transceivers are assigned 35 km distance bands. The base station 202 may also be configured so as to assign a first set of transceivers to the inner cell 204, and a second set of transceivers to the outer cell area 206.

To ensure intra cell handover is smooth, there is an overlap between the distance covered by the first transceiver and the second transceiver at the boundary 200. A mobile station 2 in the inner area 204 and adjacent the boundary 200 communicates with the first transceiver and is assigned a TA of 63 bits, whereas a mobile station 2 in the outer area 206 and adjacent the boundary 200 communicates with the second transceiver and is assigned a TA of 0 bits. The first transceiver is controlled to provide sole coverage for mobile stations from a TA of 0 bits at 0 km from the base station to a TA of 62 bits which corresponds to 34.3 km from the base station 202. For a mobile station 208 travelling away from the base station 202, the intra cell handover threshold is set on the basis of its TA, at TA=62. When the mobile station 208 increases its distance from the base station 202 such that its TA=63 bits, the handover threshold is exceeded, and handover is attempted to the second transceiver. On successfully completing handover to the second transceiver, the mobile station 208 operates with a TA of 1 bit. The second transceiver is controlled to provide sole coverage for mobile stations within the outer area 206 from a TA of 63 bits, corresponding to a distance of 69.2 km, to a TA of 1 bit, corresponding to a distance of 35.4 km from the base station 202. For a mobile station 210 travelling toward the base station 202 from the outer cell area 206, the intra cell handover threshold is set at TA=1 bit. When the mobile station 210 is assigned a TA of 0 bits, the threshold is exceeded and handover is attempted from the second transceiver to the first transceiver. On successfully completing handover to the first transceiver, the mobile station 210 is assigned a TA of 62 bits.

Inter cell handovers to neighbouring cells covered by other base stations 2 occurs from the first or second transceiver according to the standard GSM system.

The receive signal delay for which the timing of the second transceiver needs to be adjusted is 228.9 $\mu$s, corresponding to a TA of 62 bits. Delaying the timing of the second transceiver now needs to be taken into account during the call set-up procedure as the accessing mobile station 4 may be within the normal 0–35 km band or in the outer cell area beyond the normal 35 km limit.

A first alternative is to consider that the mobile stations 4 within the inner cell area 204 and the outer cell area 206 all attempt to gain access using the same RACH but that the access bursts from mobile stations beyond the 35 km limit will be delayed and need to be taken into account. The BCCH occupies the first timeslot, TA 0, of the first transceiver, TRX 1, of the base station 202. The second timeslot, TS 1, of the first transceiver is not used for SDCCH and is left vacant so tat the delayed random accesses on RACH can be received by the transceiver. The delayed random accesses on RACH are still considered to be successfully received on timeslot 0 by the first transceiver. On recieving a random access burst, the base station 202 assigns an SDCCH to the accessing mobile station using the AGCH based on the time of arrival of the access burst at the base station 2. If the mobile station is determined to be within the inner cell area 204, then an SDCCH on the timeslot 0 of the first transceiver TRX 1 is assigned for the call set-up. If required, the SDCCH will assign a TCH on the first transceiver. If the mobile station is determined to be within the outer cell area 206, then an SDCCH on the second transceiver is assigned for the call set-up procedure. The SDCCH may occupy timeslot 0 of the second transceiver. Again, if required, a TCH on the second transceiver will be assigned by the SDCCH.

Accordingly, the following resources will be available:

| TRX 1: | BCCH combined with SDCCH on TS 0 |
| --- | --- |
|  | Vacant TS 1 |
|  | 6 TS on TRX 1 for TCH |
| TRX 2: | SDCCH on TS 0 |
|  | 7 TS on TRX 2 for TCH |

A second alternative involves using the first transceiver to process access bursts from stations within the inner cell area 204, and the second transceiver to process access bursts from mobile stations within the outer cell area 206. Again, the BCCH occupies timeslot 0 of the first transceiver, and the first and second transceivers are configured to receive random access bursts on the RACH on timeslot 0 which are tuned to the frequency of the BCCH of the first transceiver. The second transceiver operates on its own assigned frequency for its remaining timeslots. A frequency hopping sequence, similar to that discussed previously, may be executed so as to ensure that the second transceiver is tuned to the frequency of the first transceiver for timeslot 0, and for the remaining timeslots, the second receiver is tuned to its own frequency. Alternatively, a dedicated receiver may be included for the second transceiver so as to specifically be used for receiving timeslot 0 at the frequency of the first transceiver.

The mobile stations within the inner cell area 204 and the outer cell area 206 will, according to the standard GSM system, synchronise their frequency to the strongest BCCH on timeslot 0. The distinction is that only the second transceiver, or receiver, would be able to handle access bursts transmitted with the delay of 228.9 $\mu$s. If a random access burst is correctly decoded by the first transceiver, then the mobile station is, in all probability, within the inner cell area 204. The base station 202 will when assign an SDCCH on the first transceiver for further communication with the mobile station. If an access burst 26 is correctly decoded by a receiver of the second transceiver, then the mobile station is, in all probability, within the other cell area 206. The base station 202 will then assign an SDCCH on the second transceiver for further communication with the mobile station.

If the mobile station is in the area of the 35 km boundary 200, the access burst may be received on both RACH channels of the transceivers. The time of arrival of the burst can then be used to determine which transceiver and SDCCH should be assigned.

According to the second alternative, the following resources are available:

| TRX 1: | BCCH/RACH combined with SDCCH on TS 0 |
|---|---|
|  | 7 TS on TRX 1 for TCH |
| TRX 2: | RACH combined with SDCCH on TS 0 |
|  | 7 TS on TRX 2 for TCH |

In addition, to assigning further transceivers to the inner and outer cell areas 204 and 206, the above method may be extended to provide coverage for a further outer cell area for the 70–105 km radius band using one or more further transceivers.

To cover mobile stations within the extended 35–70 km band a tower mounted receive front-end low noise amplifier may be used with a sharp cut-off receive filter to ensure signals in the outer area 206 are adequately received. To balance the approximate 2–3 dB improvement in uplink coverage this provides, the power of the transmitters 118 may also be increased.

The above method of increasing the GSM cell radius is particularly advantageous as it requires no alteration to the mobile stations and minimal adjustment to the transceivers of the base station. The degree of departure from the GSM standard is minor and implementation is simple.

I claim:

1. A base station for a mobile telecommunications system, adapted to communicate with mobile stations of said system which are within a cell area, said cell area being divided into an inner area in which distances to said base station are within a first predetermined range, and an outer area in which said distances are within a second predetermined range, said base station including:
   a first transceiver operating at a first carrier frequency and adapted for communication with mobile stations in said inner area; and
   a second transceiver operating at a second carrier frequency adapted for communication with mobile stations in said outer area, said second transceiver being adapted to be synchronised to receive bursts delayed by transmission over distances exceeding said first predetermined range.

2. A base station as claimed in claim 1, wherein said base station executes an intra cell handover between the first and second transceivers when a mobile station moves between said inner and outer areas.

3. A base station as claimed in claim 1, wherein said base station is a GSM station and executes a handover from said first transceiver to said second transceiver for a mobile station travelling from said inner area to said outer area when the timing advance (TA) of said mobile station exceeds a first predetermined value.

4. A base station as claimed in claim 3, wherein the TA of said mobile station is set to a second predetermined value on said handover to said second transceiver.

5. A base station as claimed in claim 4, wherein said base station executes a handover from said second transceiver to said first transceiver for a mobile station travelling from said outer area to said inner area when the TA of said mobile station falls below said second predetermined value.

6. A base station as claimed in claim 5, wherein the TA of said mobile station is set to said first predetermined value on said handover to said first transceiver.

7. A base station as claimed in claim 1, wherein a mobile station in said cell area transmits an access burst using a predetermined timeslot and one of said transceivers is adapted to receive and detect said access burst in a timeslot of said base station corresponding to said predetermined timeslot and in a succeeding timeslot to the corresponding timeslot.

8. A base station as claimed in claim 1, wherein a mobile station in said cell area transmits an access burst using a predetermined timeslot at one of said carrier frequencies, and said transceivers are both adapted to receive and detect said access burst in a timeslot of said base station corresponding to said predetermined timeslot at said one of said carrier frequencies.

9. A base station as claimed in claim 8, wherein one of said transceivers operates at said one of said carrier frequencies for the corresponding timeslot and operates at the other one of said carrier frequencies for the remaining timeslots.

10. A base station as claimed in claim 1, wherein said first predetermined range is 0–35 km and said second predetermined range is 35–70 km.

11. A base station as claimed in claim 1, including at least one further transceiver operating at another carrier frequency and adapted for communication with mobile stations in another outer area in which said distances are within another predetermined range.

12. A mobile telecommunications method, comprising:
   providing a base station having a first transceiver operating a first carrier frequency and a second transceiver operating a second carrier frequency, said base station being adapted to communicate with mobile stations or a mobile telecommunications system which are within a cell area;
   dividing said cell area into an inner area in which distances to said base station are within a first predetermined range, and an outer area in which said distances are within a second predetermined range;
   allocating communications with said mobile stations in said inner area to said first transceiver and allocating communications with mobile stations in said outer area to said second transceiver, and
   synchronising the second transceiver to receive burst delayed by transmission over distances exceeding said first predetermined range.

13. A method as claimed in claim 12, including executing an intra cell handover between the first and second transceivers when a mobile station moves between said inner and outer area.

14. A method as claimed in claim 12, wherein said base station is a GSM station and the method includes executing a handover from said first transceiver to said second transceiver for a mobile station travelling from said inner area to said outer area when the timing advance (TA) of said mobile station exceeds a first predetermined value.

15. A method as claimed in claim 14, including setting the TA of said mobile station to a second predetermined value on said handover to said second transceiver.

16. A method as claimed in claim 15, including executing a handover from said second transceiver to said first transceiver for a mobile station travelling from said outer area to said inner area when the TA of said mobile station falls below said second predetermined value.

17. A method as claimed in claim 16, including setting the TA of said mobile station to said first predetermined value on said handover to said first transceiver.

18. A method as claimed in claim 12, including transmitting an access burst from a mobile station in said cell area using a predetermined timeslot, and receiving and detecting said access burst with one of said transceivers in the timeslot corresponding to said predetermined timeslot or in the succeeding timeslot to the corresponding timeslot.

19. A method as claimed in claim 12, including transmitting an access burst from a mobile station in said cell area using a predetermined timeslot and one of said carrier frequencies, and receiving and detecting the access burst using either one of said transceivers in a timeslot corresponding to the predetermined timeslot at said one of said carrier frequencies.

20. A method as claimed in claim 19, including operating one of said transceivers at said one of said carrier frequencies for the corresponding timeslot and at the other one of said carrier frequencies for the remaining timeslots.

21. A method as claimed is in claim 12, wherein said first predetermined range is 0–35 km and said second predetermined range is 35–70 km.

22. A method as claimed in claim 12, including extending said cell area into at least one further outer area in which said distances are within another predetermined range, and allocating communications with said mobile stations in said further outer area to another transceiver operating at another carrier frequency.

23. A base station for a mobile telecommunications system, including a plurality of transceivers operating at respective carrier frequencies and which are used to communicate with mobile stations of the system within a cell area, characterised in that each transceiver is allocated a respective communication zone for communicating with mobile stations in said zone, each communication zone covers distances to said base station within a respective predetermined range, and at least one of said transceivers is adapted to be synchronised to receive bursts delayed by transmission over distances exceeding said predetermined range for another one of said transceivers.

24. A base station as claimed in claim 23, wherein the timing of said transceivers is adapted to account for different delays in communications between mobile stations in different communication zones.

25. A base station as claimed in claim 23, wherein said base station executes an intra cell handover between two of the transceivers when a mobile station moves between the communication zones.

26. An extended cell system for a mobile telecommunications system, including at lest first and second transceivers operating at respective carrier frequencies and which are used to communicate with mobile stations of the telecommunications system within a communication zone, characterised in that said communication zone includes a cell area and an extended cell area and each transceiver is allocated a respective one of said cell areas for communicating with mobile station sin said zone, said cell area covering distances to said first transceiver within a first predetermined range and said extended cell area covering distances to said second transceiver within a second predetermined range, and said second transceiver being adapted to be synchronised to receive bursts delayed by transmission over distances exceeding said first predetermined range.

27. An extended cell system as claimed in claim 26, wherein the timing of said transceivers is adapted to account for different delays in communications between mobile stations in the different cell areas.

28. An extended cell system as claimed in claim 26, wherein said extended cell system executes a handover between the transceivers when a mobile station moves between the cell areas.

* * * * *